(12) United States Patent
Greenwald et al.

(10) Patent No.: US 7,536,935 B2
(45) Date of Patent: May 26, 2009

(54) BRAKE ROTOR RESURFACING

(75) Inventors: Christopher L. Greenwald, West Lebanon, NH (US); Jeff Hastings, Hanover, NH (US)

(73) Assignee: Pro-Cut Licensing Company, LLC, West Lebanon, NH (US)

( * ) Notice: Subject to any disclaimer, the term of this patent is extended or adjusted under 35 U.S.C. 154(b) by 354 days.

(21) Appl. No.: 11/100,624

(22) Filed: Apr. 7, 2005

(65) Prior Publication Data
US 2006/0225543 A1 Oct. 12, 2006

(51) Int. Cl.
B23B 5/04 (2006.01)
B23B 3/00 (2006.01)

(52) U.S. Cl. .......................... 82/1.11; 82/112
(58) Field of Classification Search ................. 29/27 C, 29/30; 82/112, 1.11, 128, 151
See application file for complete search history.

(56) References Cited

U.S. PATENT DOCUMENTS

| | | | |
|---|---|---|---|
| 1,236,748 A | 8/1917 | Osberg et al. |
| 1,554,302 A | 9/1925 | Slyder et al. |
| 2,546,225 A | 3/1951 | Julian et al. |
| 3,303,709 A | 2/1967 | Slisz et al. |
| 3,373,622 A | 3/1968 | Stautmeister |
| 3,540,164 A | 11/1970 | Lanham |
| 3,663,795 A | 5/1972 | Myer |
| 3,895,539 A | 7/1975 | Weman et al. |
| 3,951,563 A | 4/1976 | Ravenhall |
| 4,226,146 A | 10/1980 | Ekman |
| 4,336,730 A | 6/1982 | Kopecko et al. |
| 4,388,846 A | 6/1983 | Kopecko et al. |
| 4,452,111 A | 6/1984 | Anderson |
| 4,478,116 A | 10/1984 | Fuller |
| 4,493,231 A | 1/1985 | Wossner |
| 4,523,499 A | 6/1985 | Aldridge, Jr. |
| 4,538,455 A | 9/1985 | Klufas |
| 4,561,299 A | 12/1985 | Orlando et al. |
| 4,621,546 A | 11/1986 | Morrison |

(Continued)

FOREIGN PATENT DOCUMENTS

DE 1 650 731 2/1974

(Continued)

OTHER PUBLICATIONS

James L. Cox et al., "Alignment Of Turbomachinery", pp. 1-48.

(Continued)

*Primary Examiner*—Willmon Fridie
(74) *Attorney, Agent, or Firm*—Fish & Richardson P.C.

(57) ABSTRACT

A device for resurfacing a rotor of a vehicle brake system while the rotor is mounted on the vehicle includes a cutting assembly and a finishing assembly. The cutting assembly has a cutting tool that is moveable between a cutting position where the cutting tool is configured to machine a surface of the rotor, and a retracted position where the cutting tool is spaced from the surface of the rotor. The finishing assembly is coupled to the cutting assembly and has a finishing head that is moveable between a disengaged position where the finishing head is spaced from the surface of the rotor, and a finishing position where the finishing head is configured to finish the surface of the rotor.

25 Claims, 11 Drawing Sheets

U.S. PATENT DOCUMENTS

| | | | |
|---|---|---|---|
| 4,640,158 A | 2/1987 | Link et al. | |
| 4,678,408 A | 7/1987 | Nason et al. | |
| 4,689,890 A | 9/1987 | Nishina | |
| 4,703,977 A | 11/1987 | Haanschoten | |
| 4,726,260 A | 2/1988 | Lovrenich et al. | |
| 4,774,753 A | 10/1988 | Holy et al. | |
| 4,805,286 A | 2/1989 | Uchida et al. | |
| 4,854,199 A | 8/1989 | Norman | |
| 4,870,864 A | 10/1989 | Io | |
| 4,899,218 A | 2/1990 | Waldecker et al. | |
| 4,974,164 A | 11/1990 | Lewis et al. | |
| 5,054,918 A | 10/1991 | Downing et al. | |
| 5,099,728 A | 3/1992 | Thiem | |
| 5,119,712 A * | 6/1992 | Kato | 84/626 |
| 5,152,166 A | 10/1992 | Brock et al. | |
| 5,174,149 A | 12/1992 | Grob et al. | |
| 5,201,586 A | 4/1993 | Zimmermann et al. | |
| 5,208,767 A | 5/1993 | George-Kelso et al. | |
| 5,259,150 A * | 11/1993 | Himmelsbach | 451/62 |
| 5,265,486 A | 11/1993 | Hartman et al. | |
| 5,279,192 A | 1/1994 | Hartman | |
| 5,347,895 A | 9/1994 | Bellinghausen et al. | |
| 5,377,549 A | 1/1995 | Werner | |
| 5,397,231 A | 3/1995 | Bald | |
| 5,419,222 A | 5/1995 | Beig | |
| 5,499,563 A | 3/1996 | Hansen | |
| 5,549,023 A | 8/1996 | Strout et al. | |
| 5,602,733 A | 2/1997 | Rogers et al. | |
| 5,615,589 A | 4/1997 | Roach | |
| 5,653,153 A | 8/1997 | Greenwald | |
| 5,765,457 A | 6/1998 | Meyer et al. | |
| 5,896,672 A | 4/1999 | Harris | |
| 6,044,310 A | 3/2000 | Douglass | |
| 6,050,160 A | 4/2000 | Newell et al. | |
| 6,101,911 A | 8/2000 | Newell et al. | |
| 6,216,571 B1 | 4/2001 | Newell et al. | |
| 6,327,947 B1 | 12/2001 | Newell et al. | |
| 6,330,847 B2 | 12/2001 | Newell et al. | |
| 6,553,877 B2 * | 4/2003 | Vasquez, Jr. | 82/163 |
| 6,591,720 B1 * | 7/2003 | Greenwald et al. | 82/112 |
| 6,626,073 B1 * | 9/2003 | Cunningham et al. | 82/112 |
| 6,895,841 B2 | 5/2005 | Newell et al. | |

FOREIGN PATENT DOCUMENTS

| | | |
|---|---|---|
| JP | 05-273090 | 10/1993 |

OTHER PUBLICATIONS

John Piotrowski, "How Far Can Shaft Alignment Advance?", Eleventh Annual Meeting, St. Louis, MO, Jun. 9-11, 1987, pp. 1-17.

"Web Deflection Detection System", Indikon, A Riverhawk Company, 206 Weston Avenue, Somerville, MA 02144 USA.

Office Action dated Jul. 24, 2006 for Japanese Application 10-512847 dated Aug. 1, 2006; 7 pages including English Translation.

* cited by examiner

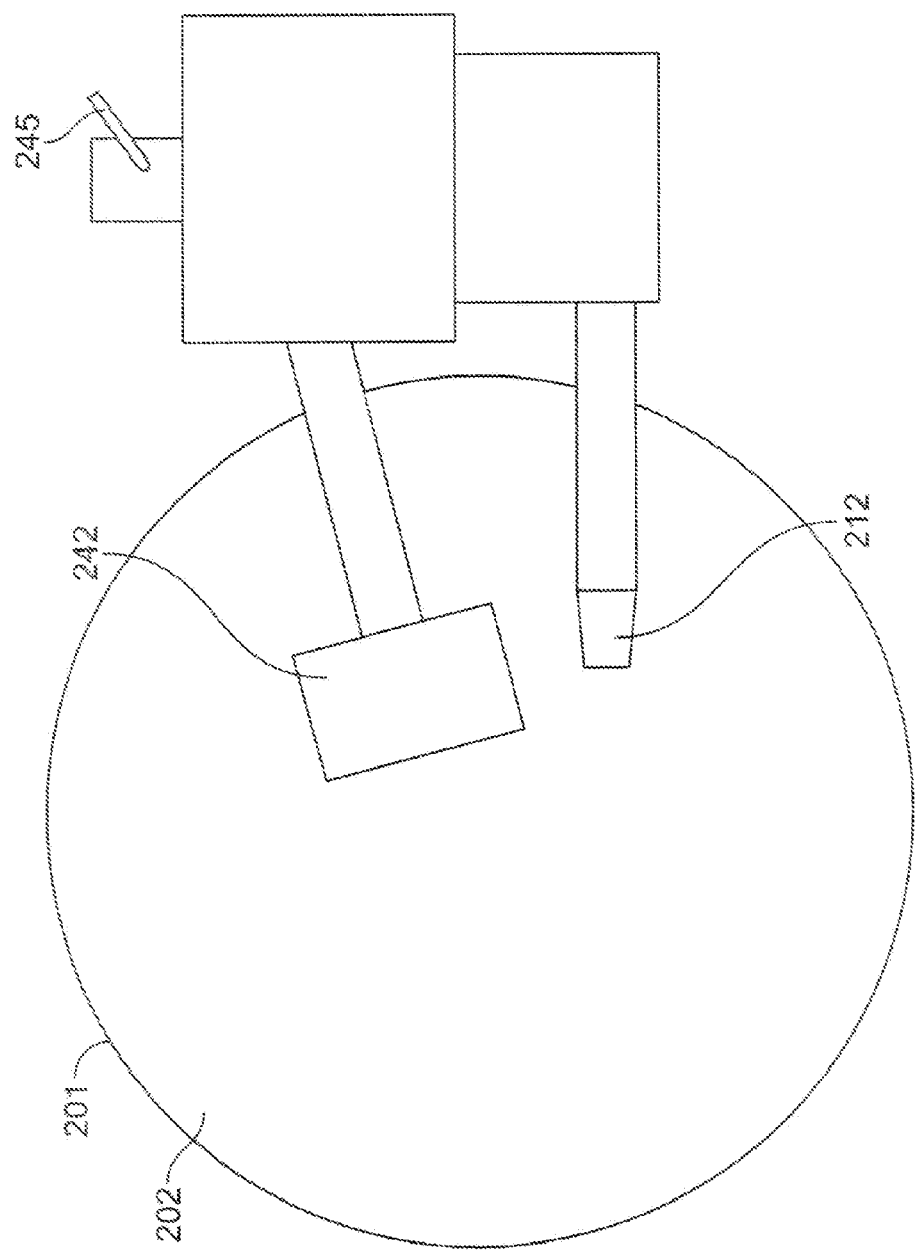

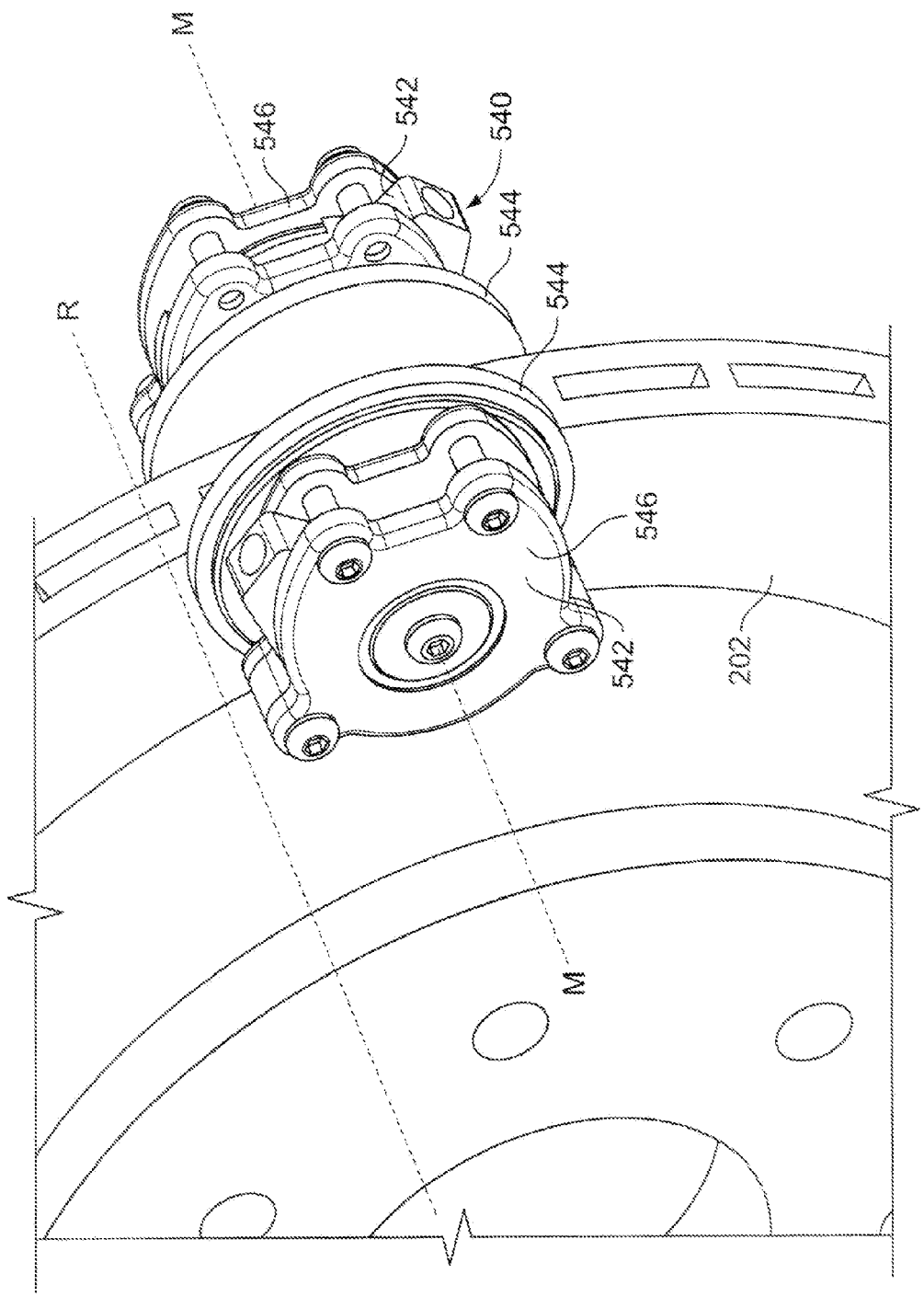

BRAKE ROTOR RESURFACING

TECHNICAL FIELD

This invention relates to devices for resurfacing vehicle brake rotors.

BACKGROUND

An on-car brake lathe can be used to resurface a vehicle brake rotor without removing the rotor from the vehicle. Such a lathe can include one or more cutting tools and a motor. The motor rotates the rotor while the cutting tools are applied to the rotor to machine one or both surfaces of the rotor. The lathe can include a positioning mechanism to adjust the position of the cutting tools relative to the rotor.

SUMMARY

In one aspect, a device for resurfacing a rotor of a vehicle brake system while the rotor is mounted on the vehicle includes a cutting assembly and a finishing assembly. The cutting assembly has a cutting tool that is moveable between a cutting position where the cutting tool is configured to machine a surface of the rotor, and a retracted position where the cutting tool is spaced from the surface of the rotor. The finishing assembly is coupled to the cutting assembly and has a finishing head that is moveable between a disengaged position where the finishing head is spaced from the surface of the rotor, and a finishing position where the finishing head is configured to finish the surface of the rotor.

Implementations may include one or more of the following features. For example, the finishing head may be positionable in the disengaged position when the cutting tool is positioned in the cutting position. The cutting tool may be positionable in the retracted position when the finishing head is positioned in the finishing position. The cutting tool may be positioned against the surface of the rotor when in the cutting position, and the finishing head may be positioned against the surface of the rotor when in the finishing position.

The finishing assembly may include one or more of a first member that enables the finishing assembly to be moved in a first direction relative to the cutting assembly, a second member that enables the finishing assembly to be moved in a second direction relative to the cutting assembly, and a third member that enables the finishing assembly to be moved in a third direction relative to the cutting assembly. The first, second, and third members each may include a hinge. The finishing assembly may include a pneumatic air sander to which the finishing head is rotatably mounted. A motor may be coupled to the cutting assembly and connectable to the rotor. The motor may be configured to rotate the rotor while the finishing head finishes the surface of the rotor.

In another aspect, a device for resurfacing a rotor of a vehicle brake system while the rotor is mounted on the vehicle includes a cutting assembly and a finishing assembly. The cutting assembly has cutting tools that are moveable between a cutting position where the cutting tools are configured to machine opposing surfaces of the rotor, and a retracted position where the cutting tools are spaced from the surfaces of the rotor. A finishing assembly is coupled to the cutting assembly and has finishing heads that are moveable between a disengaged position where the finishing heads are spaced from the surfaces of the rotor, and a finishing position where the finishing heads are configured to finish the surfaces of the rotor after the cutting tools have machined the surfaces of the rotor.

In another aspect, a method of resurfacing a rotor of a vehicle brake system while the rotor is mounted on the vehicle includes the following. A cutting tool of a cutting assembly is positioned against a surface of the rotor, while a finishing head of a finishing assembly that is coupled to the cutting assembly is positioned away from the surface of the rotor, and the surface of the rotor is machined with the cutting tool. The cutting tool is positioned away from the surface of the rotor, while the finishing head is positioned against the surface of the rotor, and the surface of the rotor is finished with the finishing head.

Implementations may include one or more of the following. The rotor may be spun while the surface of the rotor is machined and/or finished. The surface of the rotor may be finished by reducing a surface roughness of the surface of the rotor to about 20 to 40 micro-inches.

In another aspect, a method of resurfacing a rotor of a vehicle brake system while the rotor is mounted on the vehicle includes simultaneously positioning a cutting tool of a cutting assembly against a surface of a rotor and positioning a finishing head of a finishing assembly that is coupled to the cutting assembly against from the surface of the rotor. The rotor surface is machined with the cutting tool and the rotor surface is finished with the finishing head. In an implementation, the surface of the rotor is machined and finished simultaneously. In another implementation, the surface of the rotor is at least partially machined before beginning to finish the surface of the rotor.

Implementations may include one or more of the following advantages. For example, the finishing assembly, coupled to the rotating rotor, may reduce finish variation on the rotor surfaces to create an even finish on the rotor surfaces. In general, the finishing assembly may be able to finish a rotor more quickly and evenly than can be done, for example, by sanding the rotor by hand or by using a hand-controlled pneumatic air sander. Positioning the cutting assembly relative to the rotor may enable the finishing assembly to be used without having to reposition the cutting assembly.

The details of one or more implementations are set forth in the accompanying drawings and the description below. Other features will be apparent from the description and drawings, and from the claims.

DESCRIPTION OF DRAWINGS

FIG. 6 is a schematic view of an alternative implementation of a method of resurfacing a rotor using the device of FIG. 2A.

FIG. 7 is a perspective view of an alternative implementation of a device for resurfacing a rotor of a vehicle brake assembly.

DETAILED DESCRIPTION

Figure 1:
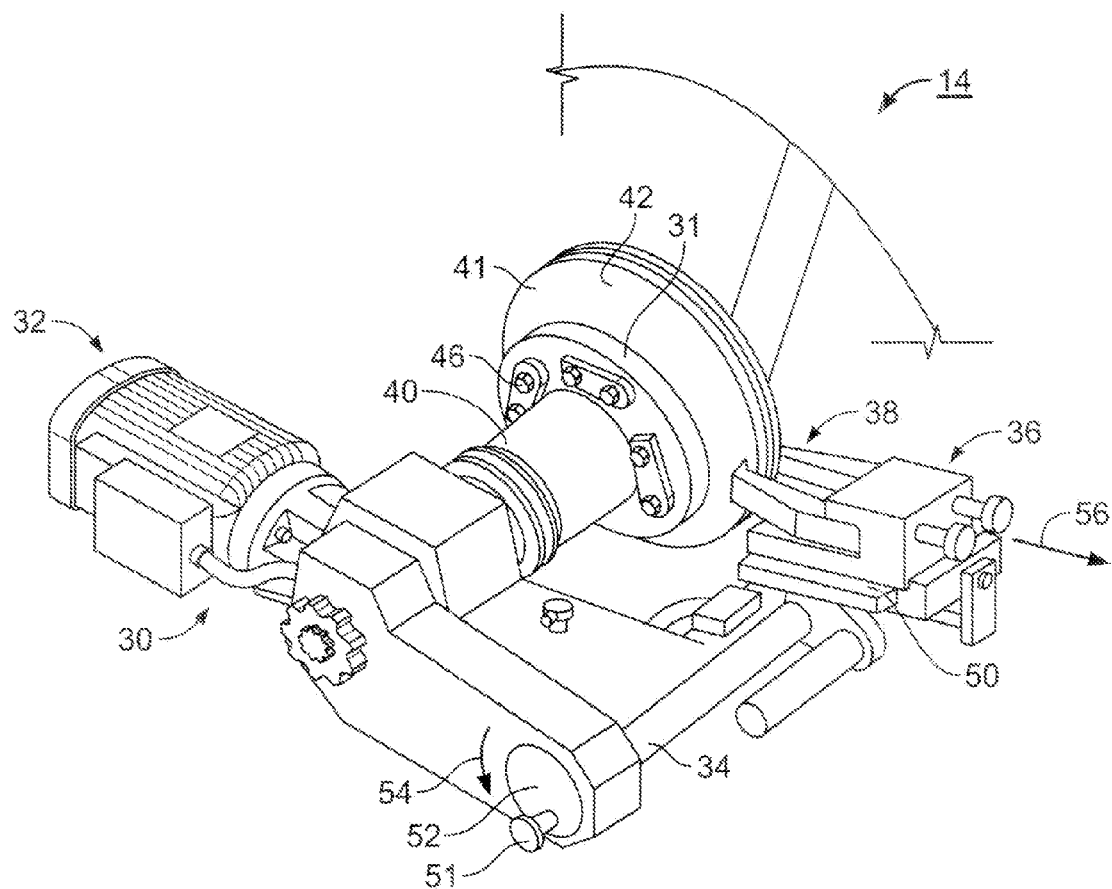
FIG. 1 is a perspective view of an on-car brake lathe.

Referring to FIG. 1, an on-car brake lathe 30 is mounted to a rotor 42 of a brake assembly of a vehicle 14 to resurface a surface 41 of the rotor 42 without removing the rotor 42 from the vehicle 14. The lathe 30 includes a motor 32, a body 34, an adaptor 40, and a cutting assembly 36 with cutting tools 38. The adaptor 40 includes a rotor-mounting portion 31 that is mounted to the rotor 42 using the lug nuts 46 usually used to secure a wheel to the rotor 42. The body 34 includes a pull knob 51 that is mounted to a rotatable disk 52, which is coupled to cutting assembly 36 via a slip clutch and gearing mechanism (not shown), such as described, for example, in U.S. Pat. Nos. 6,101,911 and 4,226,146, which are incorporated by reference. Pull knob 51 is pulled to disengage the slip clutch and rotate the disk 52 counter-clockwise along arrow 54, which positions cutting tools 38 adjacent to rotor-mounting portion 31, such that cutting tools 38 are positioned against surface 41 of rotor 42. Pull knob 51 is released to engage the slip clutch, and the motor 32 is activated. Motor 32 rotates the rotor 42, while causing cutting tools 38 to move in the direction of arrow 56, via the slip clutch and gearing mechanism, so that rotor 42 is resurfaced by cutting tools 38. The lathe 30 includes an attachment point 50 for coupling the lathe 30 to a finishing assembly, such as the finishing assembly described below.

Figure 2A:
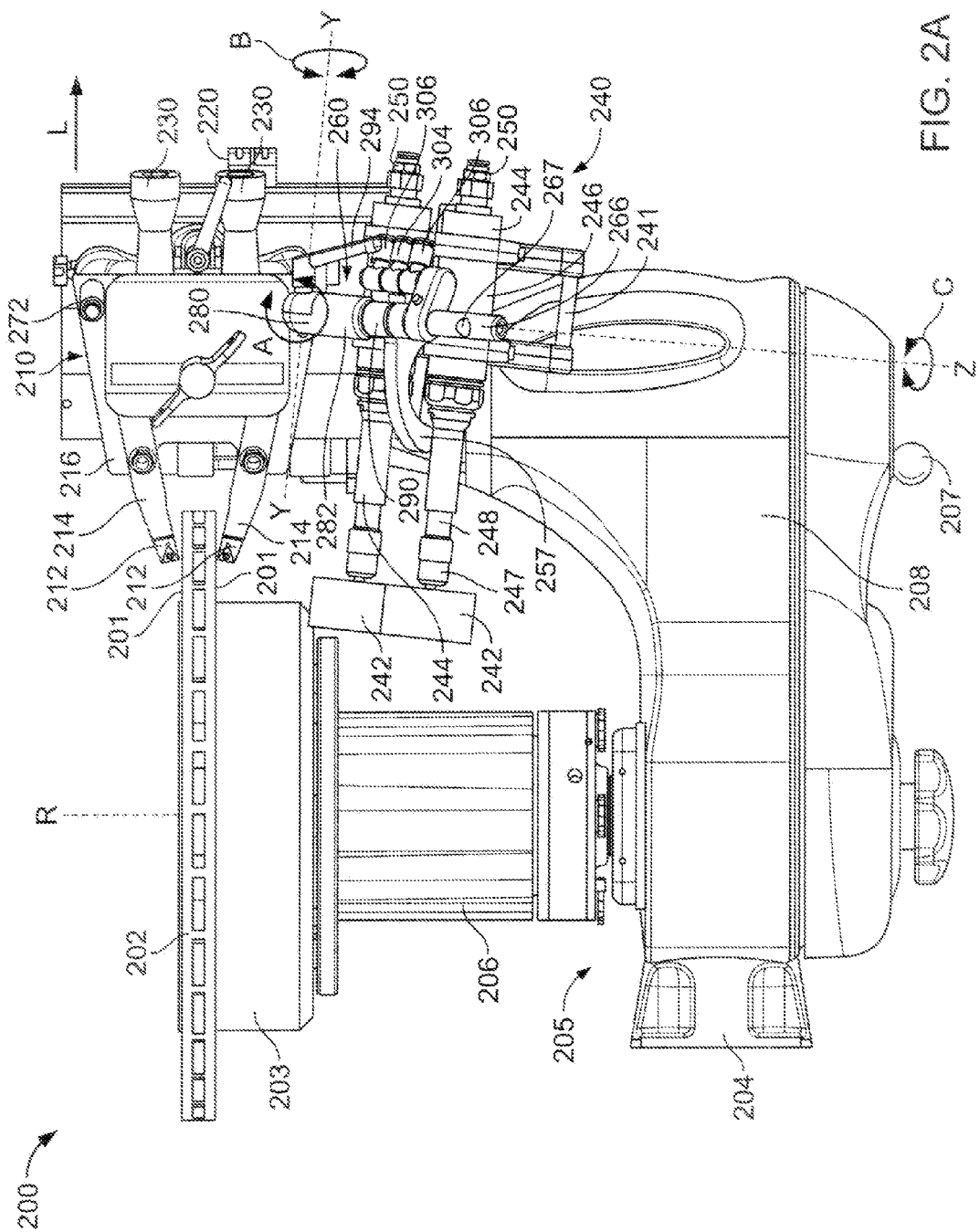
FIG. 2A is a plan view of a device for resurfacing a rotor of a vehicle brake assembly with cutting tools positioned to machine the surfaces of the rotor.
Figure 2B:
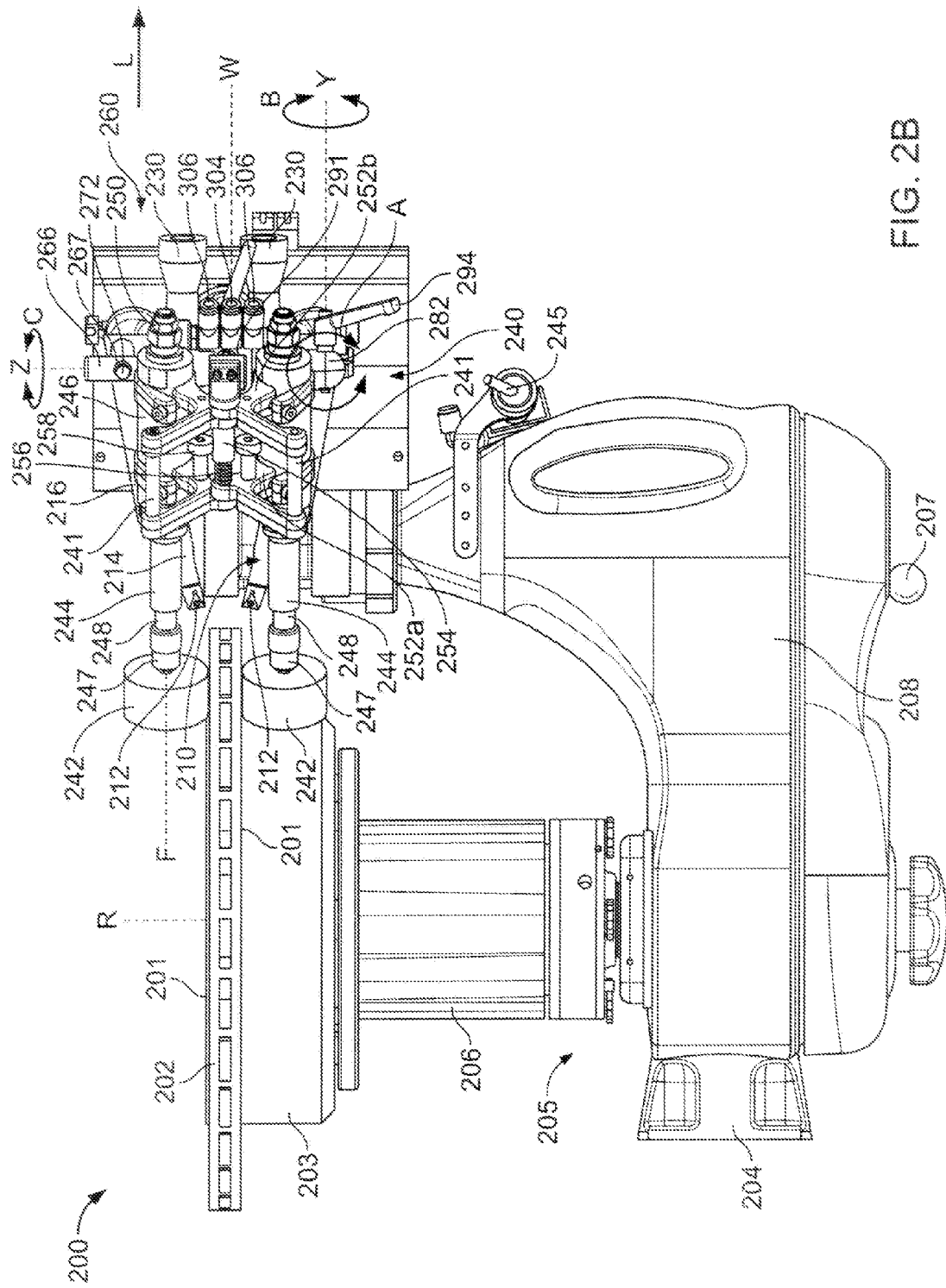
FIG. 2B is a plan view of the device of FIG. 2A with finishing heads positioned to finish the surfaces of the rotor.

Referring to FIGS. 2A and 2B, a device 200 for resurfacing surfaces 201 of a rotor 202 of a vehicle brake assembly includes a cutting assembly 210 and a finishing assembly 240. Cutting assembly 210 includes cutting tools 212 that are moveable between a cutting position (FIG. 2A) where the cutting tools 212 are positioned to machine the surfaces 201 of the rotor 202 while the rotor 202 rotates, and a retracted position (FIG. 2B) where the cutting tools 212 are spaced from the surfaces 201 of the rotor 202. Finishing assembly 240 is mounted to cutting assembly 210 and includes finishing heads 242 that are moveable between a disengaged position (FIG. 2A) where the finishing heads are spaced from the rotor 202 to allow the cutting tools 212 to machine the rotor 202, and a finishing position (FIG. 2B) where the finishing heads 242 are positioned to finish the surface of the rotor 202 after the cutting tools 212 are positioned in the retracted position.

Cutting assembly 210 is coupled to a body 208 of a lathe 205 via a slip clutch and gearing mechanism (not shown), as described above with respect to FIG. 1. Lathe 205 also includes an adaptor 206 that is mountable to the rotor 202 by a rotor-mounting portion 203, and a motor (not shown) coupled to the adaptor to rotate the rotor 202 during the machining and finishing operations.

Referring also to FIGS. 3A-5B, cutting tools 212 are moveable between the cutting position (FIGS. 2A, 3A, 4A, and 5A) and the retracted position (FIGS. 2B, 3B, 4B, and 5B) by a sliding block 216 that is coupled to the gearing mechanism of the lathe 205. Sliding block 216 defines a dovetail-shaped opening 218 that receives a dovetail-shaped flange 222 of a sliding track 220. Prior to the machining operation, cutting tools 212 can be adjusted to minimize lateral runout, as described, for example, in above-mentioned U.S. Pat. No. 6,101,911. To position the cutting tools 212 in the cutting position, a pull knob 207 coupled to body 208 is pulled to disengage the slip clutch and rotate a disk 209 counter-clockwise to move sliding block 216 in a direction opposite to arrow L such that cutting tools are positioned in the cutting position, adjacent to rotor-mounting portion 203.

When in the cutting position, the cutting tools 212 are positioned against the surfaces 201 of rotor 202 to machine the rotor. The cutting depth of cutting tools 212 relative to rotor 202 can be adjusted by dials 230 that are coupled to cutting arms 214. The cutting depth can be locked into place by a locking knob 224. During the machining operation, the slip clutch engages the gearing mechanism and the motor causes sliding block 216 to move in the direction of arrow L such that cutting tools 212 move across the surfaces 201 of rotor 202 and return to their retracted position.

The finishing heads 242 of finishing assembly 240 each are mounted to a pneumatic air sander 244. For example, in certain implementations, sander 244 is implemented using a model KL-206 Air Die Grinder, manufactured by the YKT Air Tool Company, of Taiwan R.O.C. Each sander 244 has a generally cylindrical housing 246, a rotating shaft 248, a collet 247 to which is mounted the finishing head 242, and a port 250 for attachment to an air hose (not shown) that serves as a source of compressed air. Also coupled to finishing assembly by a mounting block 303 is an air inlet port 304 fluidly connected to a pair of air output ports 306. The pneumatic air sander 244 is activated by delivering compressed air through a hose (not shown) into an air inlet port 304, which transmits the compressed air to air output ports 306. The air is delivered by a pair of hoses (not shown) from air output ports 306 to ports 250. The delivered air causes rotation of shafts 248, collets 247, and finishing heads 242. Each finishing head 242 rotates about an axis F which is substantially orthogonal to an axis R about which rotor 202 rotates.

Each finishing head 242 includes a cylindrical center shaft that fits into collet 247 and an abrasive pad that finishes the surface 201 of the rotor 202, such as by grinding, sanding, or polishing. The abrasive pad is composed, for example, of non-woven abrasive fabric or flaps of fabric coated with sandpaper-like material with abrasive secured to the fibers of the fabric in a random matrix. In an alternative implementation, the pads can be composed of abrasive bits suspended in a rubber or plastic matrix or of a laminate of woven pads. As the pads are used, the outer fibers break off, exposing newer material underneath. When all of the material on the pad has been worn, the entire finishing head 242 can be replaced. The finishing heads can have a wide range of abrasive roughness. In one implementation, the abrasive roughness of the finishing head 242 is sufficient to reduce the surface roughness of the rotor surfaces 201, after machining, to about 20 to 40 micro-inches.

Each cylindrical housing 246 is coupled to a pair of connecting arms 252a and 252b. Each pair of connecting arms 252a and 252b is pivotably mounted to a mounting cylinder 254 such that the connecting arms 252a and 252b can pivot about an axis W of mounting cylinder 254, and the air sanders 244 can be moved towards or away from each other.

As best shown in FIG. 2B, a coil spring 256 is wound around mounting cylinder 254 and coupled to connecting arms 252a. Coil spring 256 biases the pneumatic air sanders 244 towards each other, which biases the finishing heads 242 against the surfaces 201 of rotor 202. Coil spring 256 is coupled to connecting arms 252a by shoulder screws 258. The spring constant of spring 256 and the position of shoulder screws 258 determines the pressure exerted by finishing heads 242 against the surfaces 201 of rotor 202. Generally, at least a small gap is kept between the finishing heads 242 to prevent the finishing heads 242 from rubbing against each other when they are not applied to the rotor 202. In certain implementations, the pressure exerted by finishing heads 242 is predetermined for the user. In other implementations, the user may adjust shoulder screws 258 to adjust the pressure.

Figure 3A:
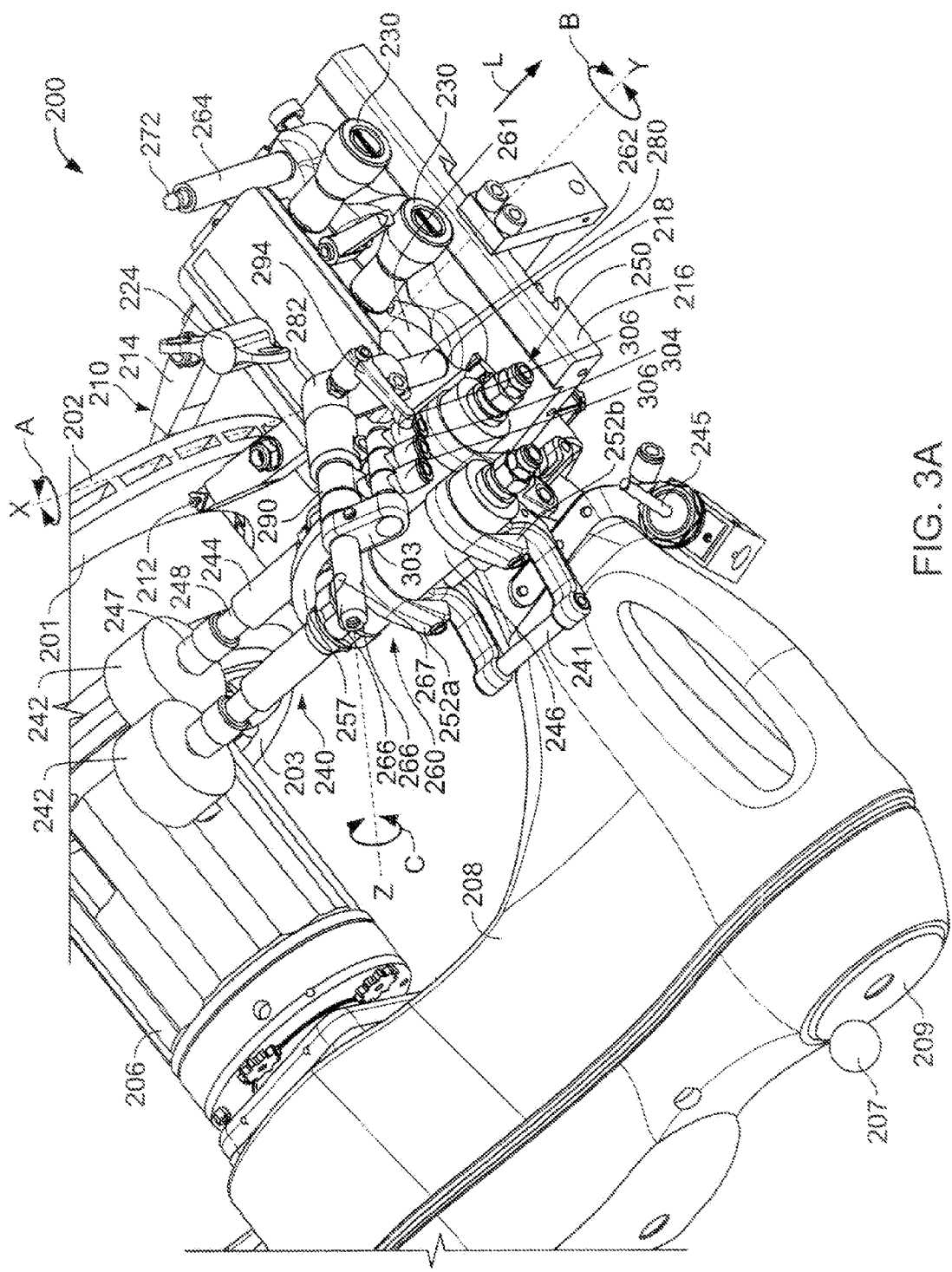
FIG. 3A is a perspective view of the device of FIG. 2A positioned as shown in FIG. 2A.
Figure 3B:
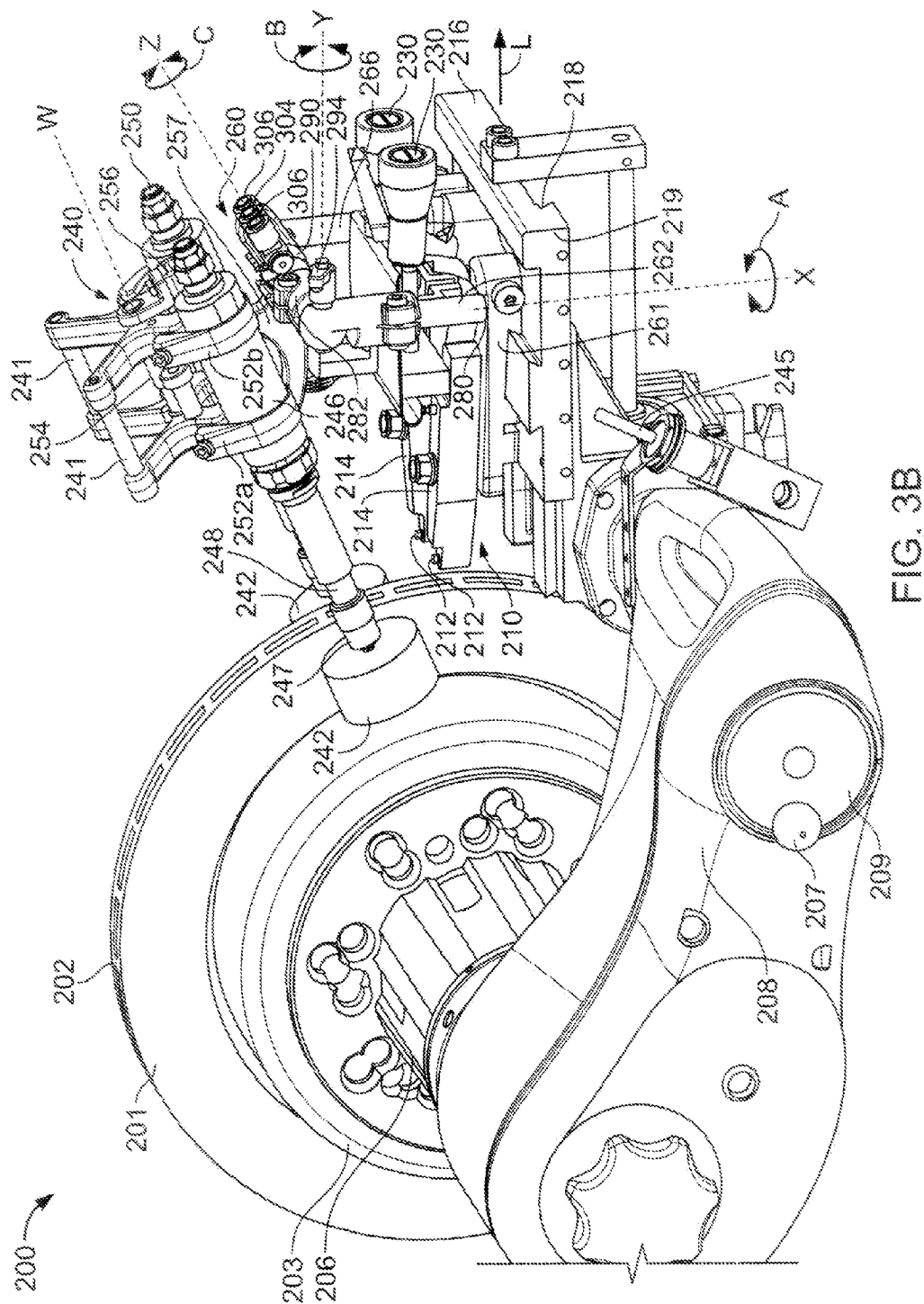
FIG. 3B is a perspective view of the device of FIG. 2A positioned as shown in FIG. 2B.
Figure 4A:
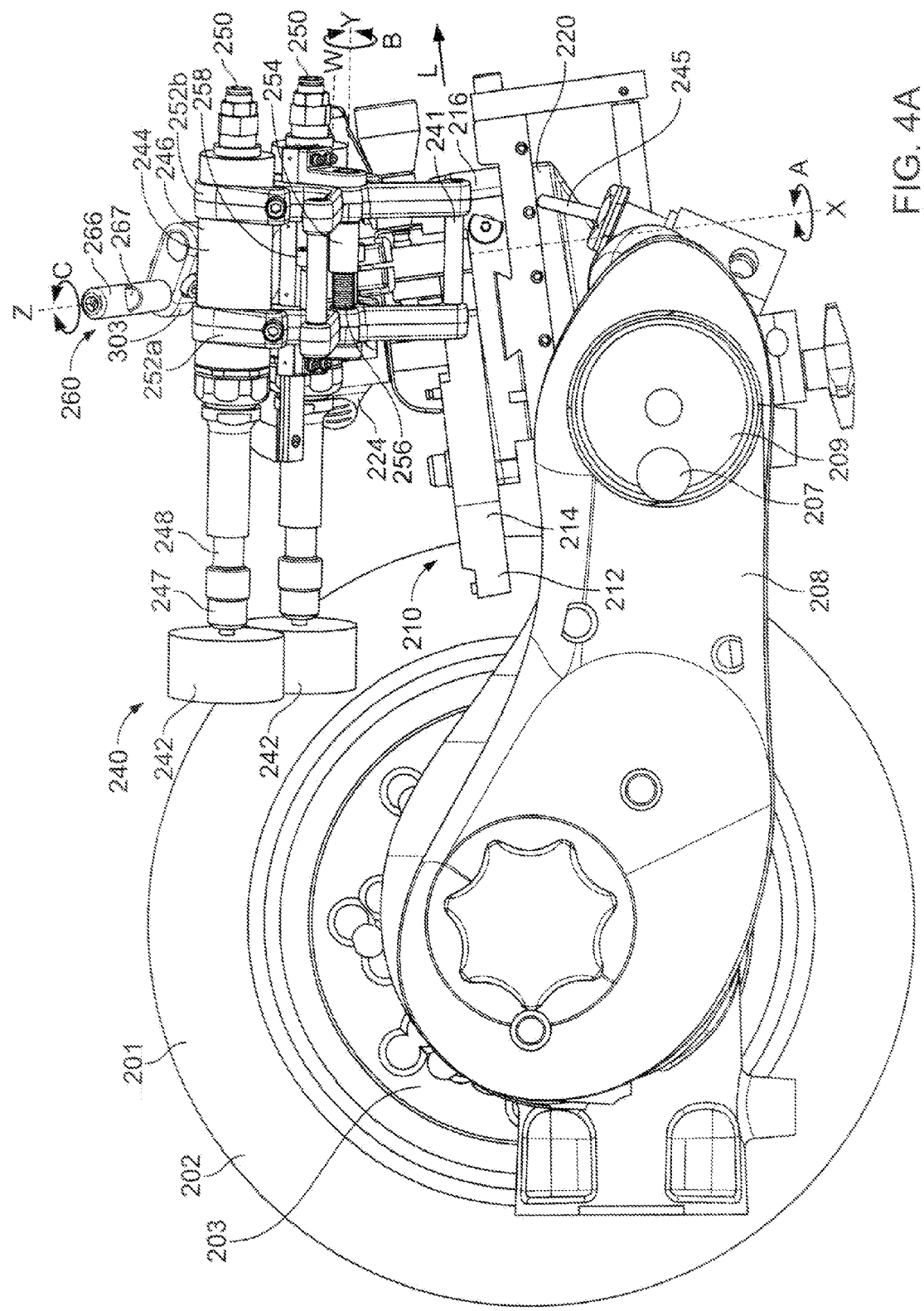
FIG. 4A is a side view of the device of FIG. 2A positioned as shown in FIG. 2A.
Figure 4B:
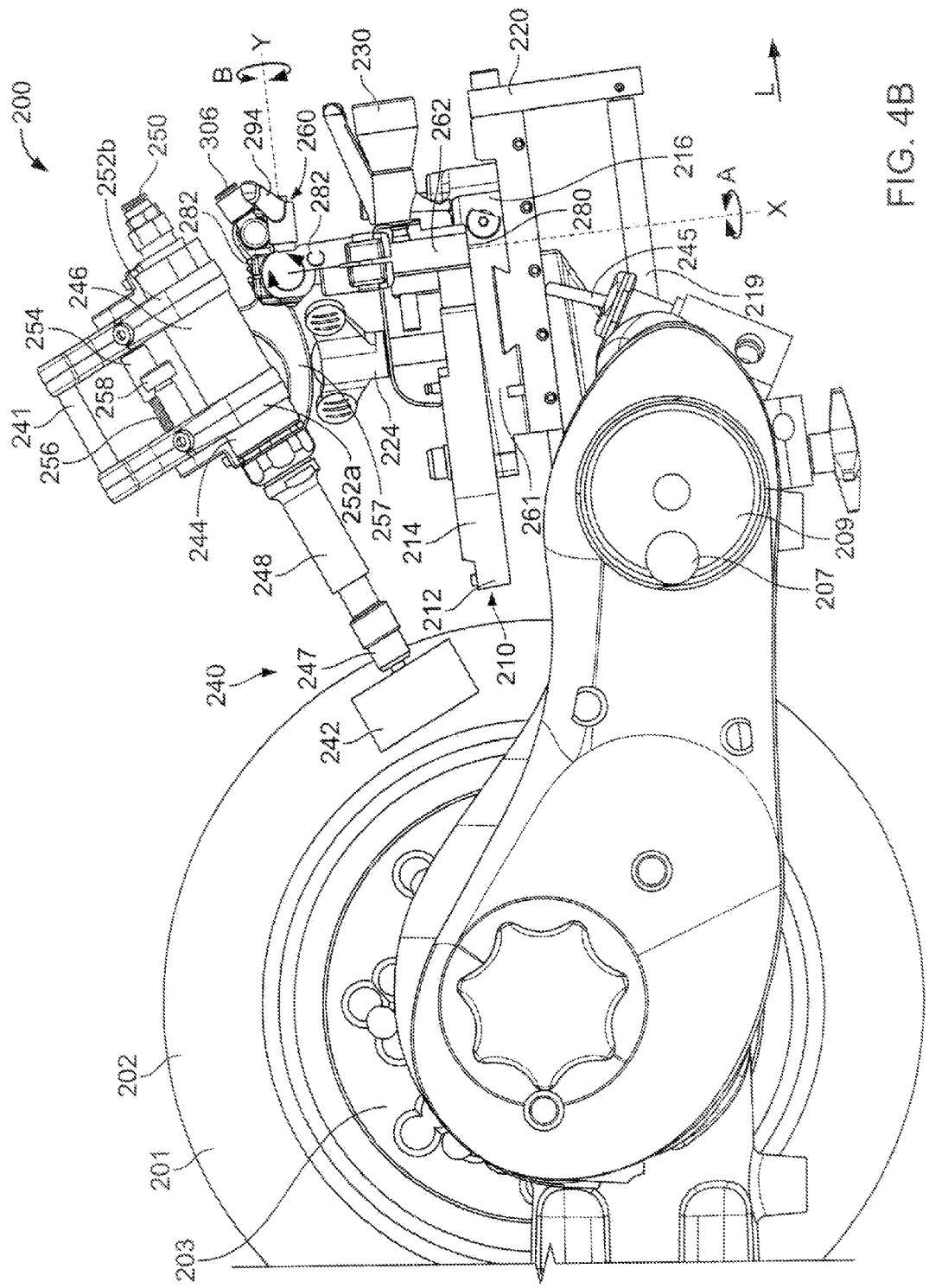
FIG. 4B is a side view of the device of FIG. 2A positioned as shown in FIG. 2B.
Figure 5A:
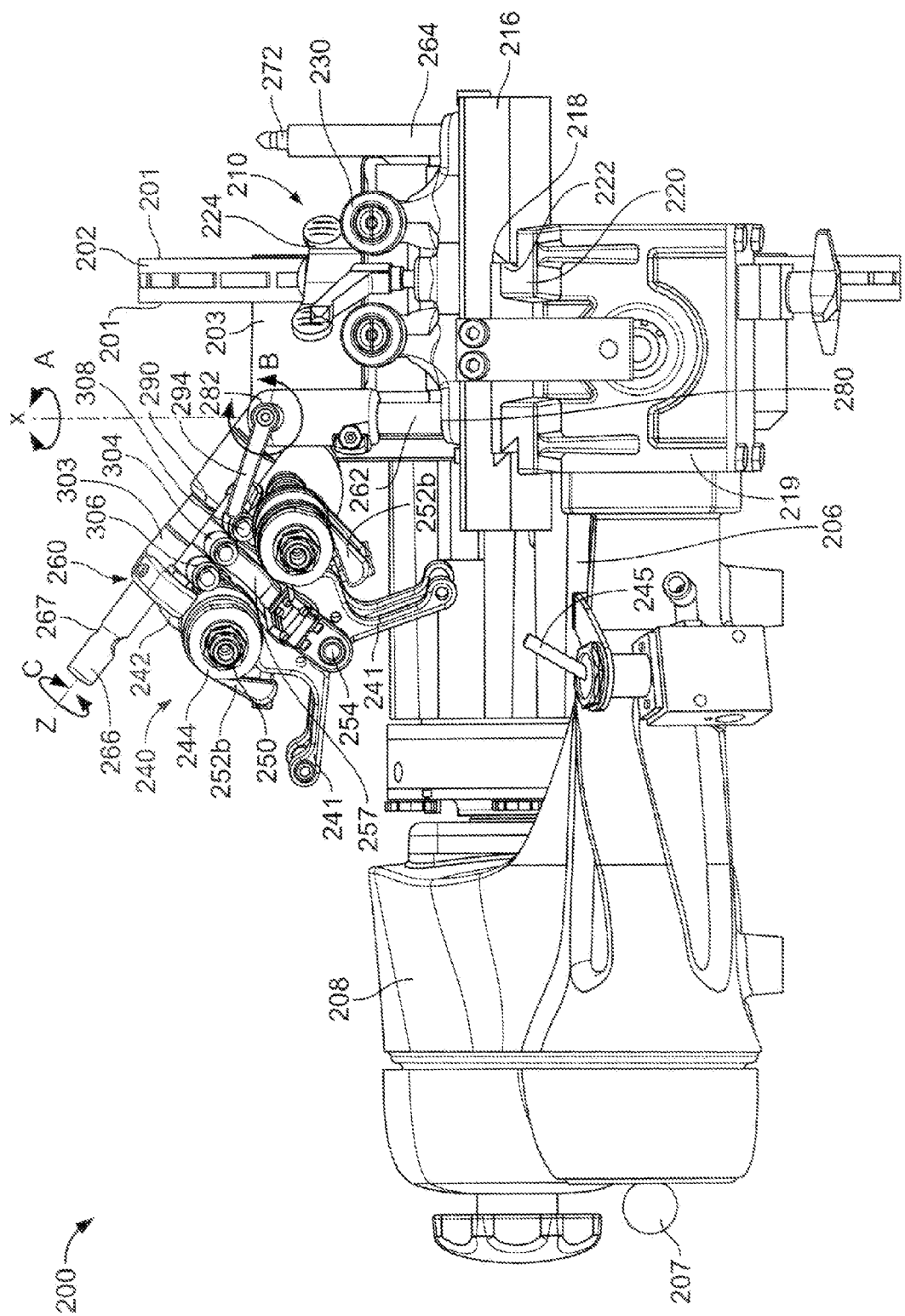
FIG. 5A is an end view of the device of FIG. 2A positioned as shown in FIG. 2A.
Figure 5B:
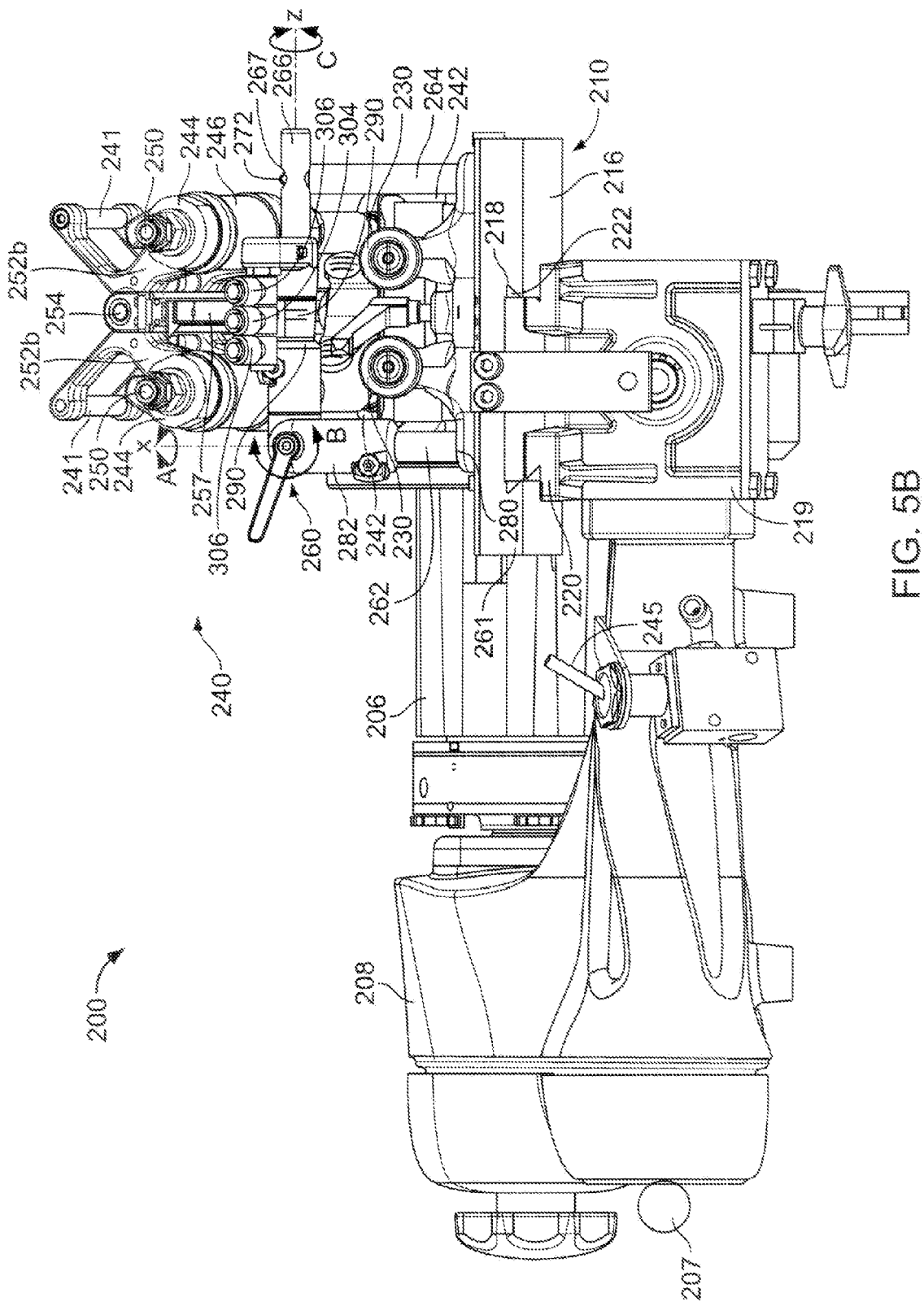
FIG. 5B is an end view of the device of FIG. 2A positioned as shown in FIG. 2B.

Each air sander 244 is coupled to a handle 241 so that air sanders 244 can be moved between the disengaged position (FIGS. 2A, 3A, 4A, and 5A) and the finishing position (FIGS. 2B, 3B, 4B, and 5B) by a mounting arm 257 connected to a hinge assembly 260 that is coupled to cutting assembly 210. As best shown in FIGS. 3A and 3B, hinge assembly 260 includes a base plate 261, a left support strut 262, a right support strut 264, and a cross-bar 266. Mounting arm 257 is mounted to a middle portion of cross-bar 266. Right support strut 264 includes an end portion 272 that is configured to be received in an aperture 267 in cross-bar 266 when finishing heads 242 are in the finishing position, as shown in FIG. 3B.

As best shown in FIGS. 3A and 3B, left support strut 262 is pivotably mounted to base plate 261 by a first hinge 280 in the form of a bore in base plate 261 that allows left support strut 262 to rotate about an axis X of left support strut 262 in a direction A. Cross-bar 266 is pivotably coupled to left support strut 262 by a second hinge 282 that allows the cross-bar 266 to rotate about an axis Y in a direction B. Mounting arm 257 is pivotably coupled to cross bar 266 by a third hinge 290 such that mounting arm 257 can rotate about an axis Z of cross-bar 266 in a direction C. Thus, hinge assembly 260 allows finishing heads 262 to be moved about axes X, Y, Z, in at least three degrees of freedom between the disengaged position (FIGS. 2A, 3A, 4A, and 5A) and the finishing position (FIGS. 2B, 3B, 4B, and 5B).

First hinge 280 includes one or more O-rings (not shown) to frictionally hold strut 262 in place relative to base plate 261. Second hinge 282 includes a tensioning lever 294 that locks cross-bar 266 in a position relative to strut 262. Third hinge 290 includes a screw (not shown) that adjusts friction between mounting arm 257 and cross-bar 266. Referring to FIGS. 2A and 2B, mounting arm 257 is coupled to a sliding undercarriage 291 that allows the entire finishing assembly 240 to be moved longitudinally along axis W. Handles 241 can be squeezed together to separate finishing heads 242 and allow finishing heads 242 to be positioned adjacent to surfaces 201 of rotor 202.

In operation, the motor is mounted to the rotor 202 by rotor-mounting portion 203 of adaptor 206. As shown in FIGS. 2A, 3A, 4A, and 5A, air sanders 244 and finishing heads 242 initially are positioned in the disengaged position away from the surfaces 201 of rotor 202. Sliding block 216 is moved towards rotor 202 in a direction opposite to arrow L to position cutting tools 212 in the cutting position against the surfaces 201 of rotor 202. A switch (not shown) on the device 200 is activated to turn on the motor, which spins rotor 202, for example at about 120 revolutions per minute (rpm), so that cutting tools 212 machine the surfaces 201 of rotor 202 and gradually move across rotor 202 back to their retracted position. After machining, the surfaces 201 of rotor 202 will have a surface roughness, for example, of about 60 to 100 microinches.

As shown in FIGS. 2B, 3B, 4B, and 5B, after the surfaces 201 of rotor 202 have been machined, the switch on the device 200 is deactivated to stop the motor and air sanders 244 and finishing heads 242 are moved about axes X, Y, and Z in directions A, B, and C to position finishing heads 242 in the finishing position against the surfaces 201 of the rotor 202, with end portion 272 of post 264 received in aperture 267 in cross-bar 266. The switch on the device is activated, which restarts the motor to spin rotor 202 (for example at about 120 rpm). A separate switch 245 is used to activate air sanders 244, which spin finishing heads 242 to finish the surfaces 201 of the rotor 202, such as by grinding, sanding or polishing the surfaces 201. Finishing heads 242 spin at a much higher rotational speed than rotor 202 (for example at about 15,000 rpm) and can be applied for a predetermined amount of time (for example about 40 seconds). During the finishing operation, handles 241 are used to move the finishing heads 242 across the surfaces 201 of rotor 202. After the finishing operation is complete, the switch is deactivated to stop the motor and the finishing heads 232. The finishing heads 232 are removed to their disengaged position and the device 200 is removed from the rotor 202.

Referring to the schematic diagram of FIG. 6, in an alternative implementation, device 200 may be used to resurface surfaces 201 of a rotor 202 by simultaneously positioning cutting tools 212 and finishing heads 242 against the surfaces 201 of rotor 202. In one such implementation, the motor is activated to spin rotor 202 while the switch 245 is activated to spin finishing heads 242, such that the cutting tools 212 and the finishing heads 242 simultaneously machine and finish the surfaces 201 of rotor 202. In another such implementation, the motor is initially activated to spin rotor 202 so that cutting tools 212 at least partially machine the surfaces 201 of rotor 202. Once the surfaces 201 are at least partially machined, switch 245 is activated to spin finishing heads 242 and finish surfaces 201 while the cutting tools 212 complete the machining of surfaces 201.

Referring to FIG. 7, in an alternative implementation, finishing assembly 540 can include pancake-shaped finishing heads 542 for finishing the surface of rotor 202. Each finishing head 542 includes a disc-shaped abrasive member 544 coupled to a pneumatically actuated disc-shaped rotation member 546. Rotation member 546 rotates abrasive member 544 about an axis M that is substantially parallel to the axis R about which rotor 202 rotates. Finishing heads 542 can be positioned adjacent to rotor or away from rotor using handles (not shown) that are analogous to the handles used to position the finishing heads 242, as described above.

A number of implementations have been described. Nevertheless, it will be understood that various modifications may be made. For example, the device may include only one cutting blade and one finishing head to resurface only one surface of the rotor. The finishing assembly can be configured to receive different finishing heads, such as heads having different grades of abrasive material, to finish the surfaces of the rotor to different amounts of surface roughness. The finishing heads can be powered by another mechanism, such as an electric motor tool. The finishing heads can be configured to rotate about an axis that is substantially parallel to the axis about which the rotor rotates. The finishing assembly can be mounted to another part of the brake lathe rather than adjacent to the cutting assembly. The finishing process may be repeated more than once with these different finishing heads. The positioning of the cutting assembly and the finishing assembly can be manual or automated (for example computer controlled).

The cutting assembly and the finishing assembly can be configured so that the cutting tools and the finishing heads can be moved to and from the surfaces of the rotor with more or fewer degrees of freedom and in different configurations, for example, moving longitudinally about axes other than the axis W. The orientations and movement of the finishing assembly relative to the cutting assembly can be reversed. The first, second, and third hinges can be locked in place, for example, by tensioning levers, friction fit, or set screws. The finishing heads can be mounted to other types of finishing assemblies such that the rotational axis of the finishing heads is parallel to the rotational axis of the rotor and such that an axial face of the finishing heads is in contact with the rotor surface.

During the finishing operation, an automated mechanism can move the finishing heads across the surfaces of the rotor. The finishing head may be large enough to cover the entire radial surface of the rotor so that the finishing head would not need to be moved with respect to the rotor during a finishing operation. The connecting arms of the finishing assembly may be individually biased against the surface of the rotor, and the pressure of each may be individually adjustable. A single switch can be used to activate the motor and the finishing heads. The cutting heads and the finishing heads can be configured to be applied to the rotor at the same time to machine and finish the surface of the rotor in less time. The cross bar that carries the finishing heads can be received in a yoke attached to an end portion of the post when the finishing heads are in the finishing position.

These and other implementations are within the scope of the following claims.

What is claimed is:

1. A device for resurfacing a rotor of a vehicle brake system while the rotor is mounted on the vehicle, the device comprising:
   a cutting assembly having a cutting tool that is moveable between a cutting position where the cutting tool is configured to machine a surface of the rotor, and a retracted position where the cutting tool is spaced from the surface of the rotor;
   a body coupled to the cutting assembly and having structure for connection to the vehicle such that the cutting tool may be positioned in the cutting position when the body is connected to the vehicle; and
   finishing assembly coupled to the cutting assembly and comprising a first member that enables the finishing assembly to be moved in a first direction relative to the cutting assembly, the finishing assembly having a finishing head that is moveable between a disengaged position where the finishing head is spaced from the surface of the rotor, and a finishing position where the finishing head is configured to finish the surface of the rotor.

2. The device of claim 1 wherein the finishing head is positionable in the disengaged position when the cutting tool is positioned in the cutting position.

3. The device of claim 1 wherein the cutting tool is positionable in the retracted position when the finishing head is positioned in the finishing position.

4. The device of claim 1 wherein the cutting tool is positioned against the surface of the rotor when in the cutting position.

5. The device of claim 1 wherein the finishing head is positioned against the surface of the rotor when in the finishing position.

6. The device of claim 1 wherein the finishing assembly further comprises a second member that enables the finishing assembly to be moved in a second direction relative to the cutting assembly.

7. The device of claim 6 wherein the finishing assembly further comprises a third member that enables the finishing assembly to be moved in a third direction relative to the cutting assembly.

8. The device of claim 7 wherein one or more of the first, second, and third members comprises a hinge.

9. The device of claim 1 wherein the first direction comprises a rotation about an axis.

10. The device of claim 1 wherein the first direction comprises a movement longitudinally along an axis.

11. The device of claim 1 wherein the finishing assembly comprises a pneumatic air sander to which the finishing head is rotatably mounted.

12. The device of claim 1 further comprising a motor coupled to the cutting assembly and connectable to the rotor.

13. The device of claim 12 wherein the motor is configured to rotate the rotor while the finishing head finishes the surface of the rotor.

14. A device for resurfacing a rotor of a vehicle brake system while the rotor is mounted on the vehicle, the device comprising:
   a cutting assembly having cutting tools that are moveable between a cutting position where the cutting tools are configured to machine opposing surfaces of the rotor, and a retracted position where the cutting tools are spaced from the surfaces of the rotor;
   a body coupled to the cutting assembly and having structure for connection to the vehicle such that the cutting tool may be positioned in the cutting position when the body is connected to the vehicle; and
   a finishing assembly coupled to the cutting assembly and comprising a member that enables the finishing assembly to be moved in a first direction relative to the cutting assembly, the finishing assembly having finishing heads that are moveable between a disengaged position where the finishing heads are spaced from the surfaces of the rotor, and a finishing position where the finishing heads are configured to finish the surfaces of the rotor after the cutting tools have machined the surfaces of the rotor.

15. A method of resurfacing a rotor of a vehicle brake system while the rotor is mounted on the vehicle, comprising:
   coupling a cutting assembly to the vehicle;
   positioning a cutting tool of the coupled cutting assembly against a surface of the rotor, while moving a finishing head of a finishing assembly that is coupled to the cutting assembly in a first direction relative to the cutting assembly and away from the surface of the rotor;
   machining the surface of the rotor with the cutting tool;
   positioning the cutting tool away from the surface of the rotor, while moving the finishing head in a second direction relative to the cutting assembly and against the surface of the rotor; and
   finishing the surface of the rotor with the finishing head.

16. The method of claim 15 further comprising spinning the rotor while finishing the surface of the rotor.

17. The method of claim 15 wherein finishing the surface of the rotor comprises reducing a surface roughness of the surface of the rotor to about 20 to 40 micro-inches.

18. The method of claim 15 wherein finishing the surface of the rotor comprises moving the finishing head across the rotor.

19. A device for resurfacing a rotor of a vehicle brake system while the rotor is mounted on the vehicle, the device comprising:
   a cutting assembly having a cutting tool that is moveable between a cutting position where the cutting tool is configured to machine a surface of the rotor, and a retracted position where the cutting tool is spaced from the surface of the rotor; and
   a finishing assembly coupled to the cutting assembly and having a finishing head that is moveable between a disengaged position where the finishing head is spaced from the surface of the rotor, and a finishing position where the finishing head is configured to finish the surface of the rotor, and having a first member that enables the finishing assembly to be moved in a first direction relative to the cutting assembly.

20. The device of claim 19 wherein the first direction comprises a rotation about an axis.

21. The device of claim 19 wherein the first direction comprises a movement longitudinally along an axis.

22. A device for resurfacing a rotor of a vehicle brake system while the rotor is mounted on the vehicle, the device comprising:
- a cutting assembly having a cutting tool that is moveable between a cutting position where the cutting tool is configured to machine a surface of the rotor, and a retracted position where the cutting tool is spaced from the surface of the rotor;
- a finishing assembly coupled to the cutting assembly and having a finishing head that is moveable between a disengaged position where the finishing head is spaced from the surface of the rotor, and a finishing position where the finishing head is configured to finish the surface of the rotor; and
- a motor coupled to the cutting assembly and connectable to the rotor.

23. The device of claim 22 wherein the motor is configured to rotate the rotor while the finishing head finishes the surface of the rotor.

24. A method of resurfacing a rotor of a vehicle brake system while the rotor is mounted on the vehicle, comprising:
- positioning a cutting tool of a cutting assembly against a surface of the rotor, while positioning a finishing head of a finishing assembly that is coupled the cutting assembly away from the surface of the rotor;
- machining the surface of the rotor with the cutting tool;
- positioning the cutting tool away from the surface of the rotor, while positioning the finishing head against the surface of the rotor;
- finishing the surface of the rotor with the finishing head; and
- spinning the rotor while finishing the surface of the rotor.

25. The method of claim 24 wherein finishing the surface of the rotor comprises moving the finishing head across the rotor.

* * * * *